Patented Sept. 8, 1931

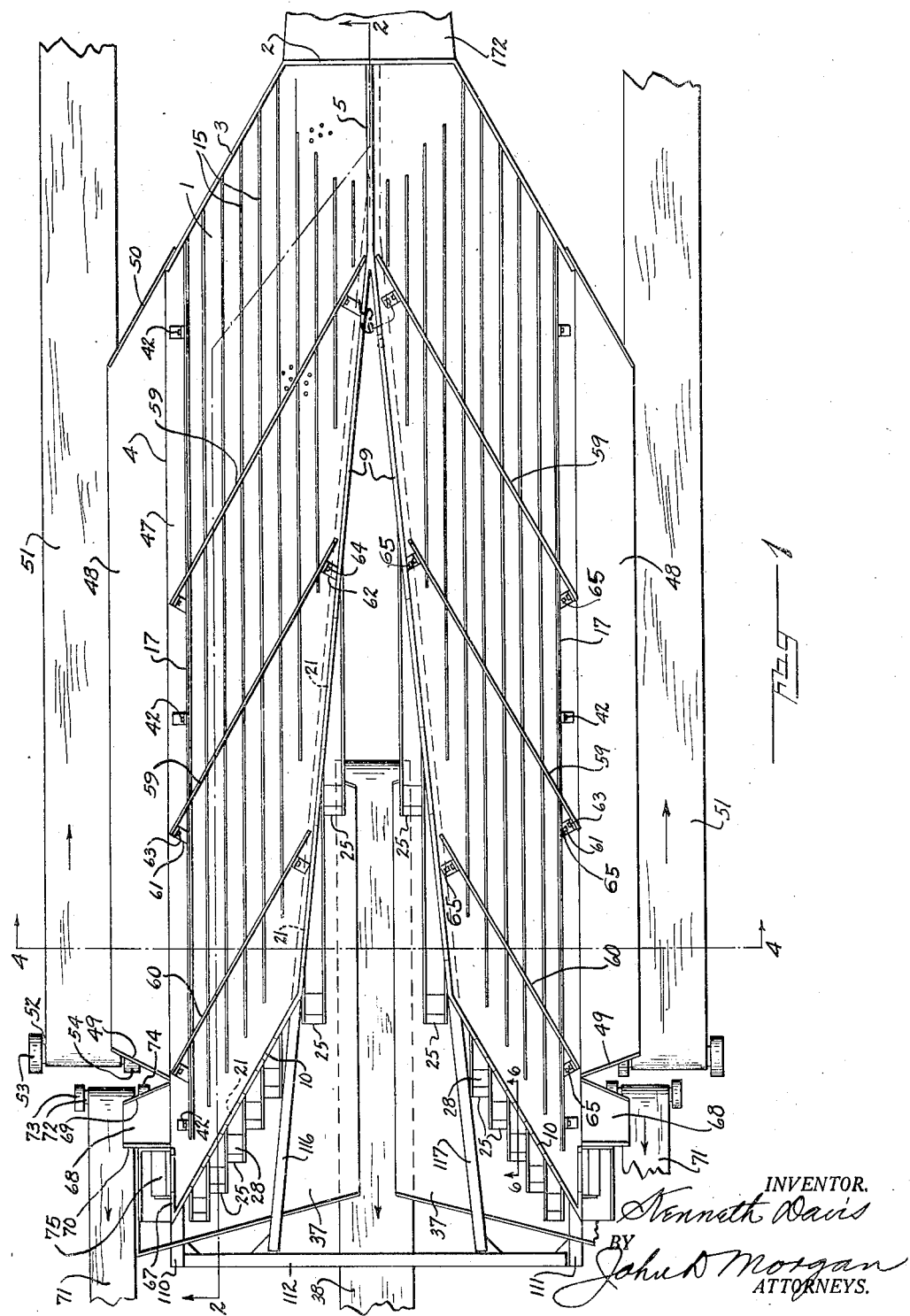

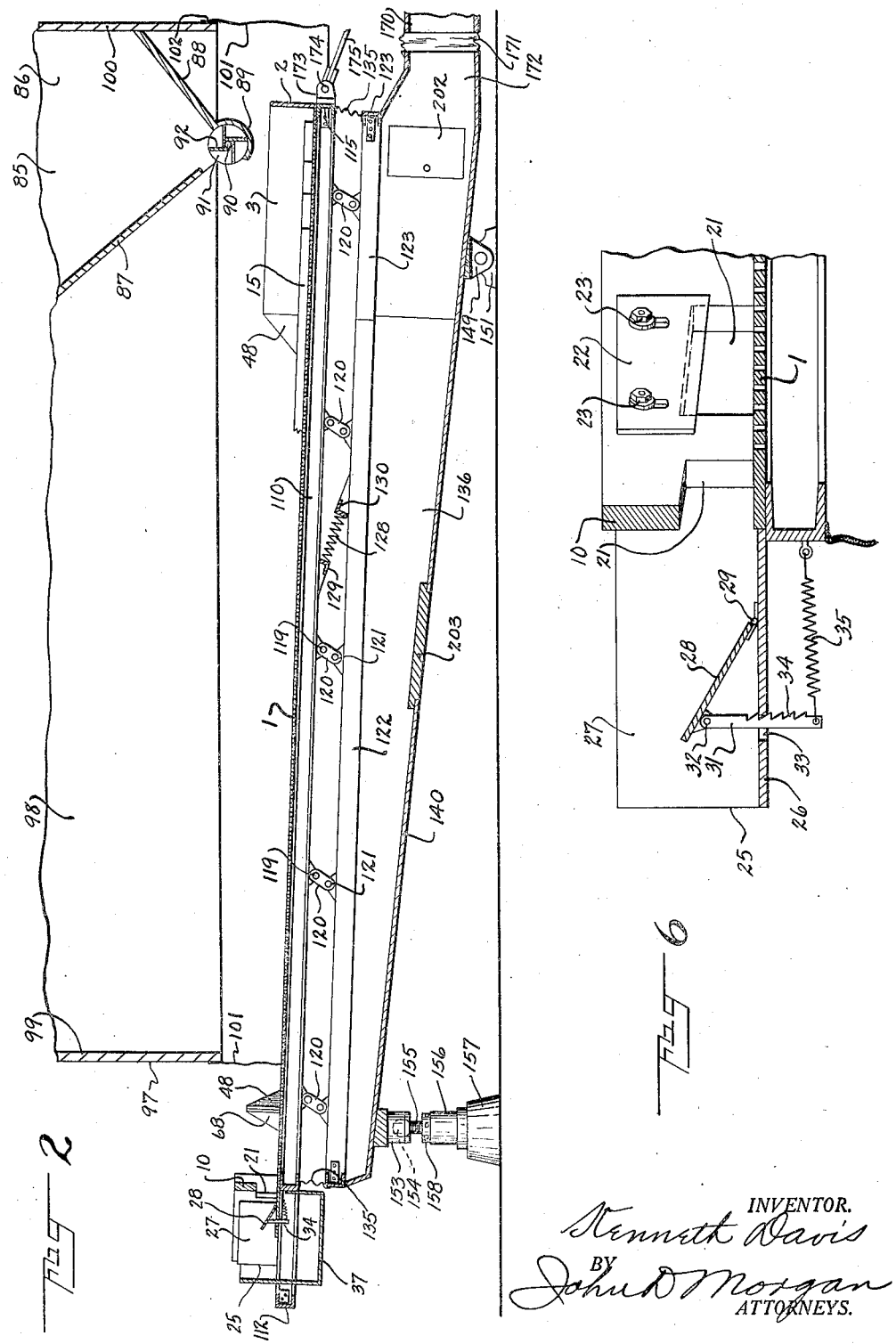

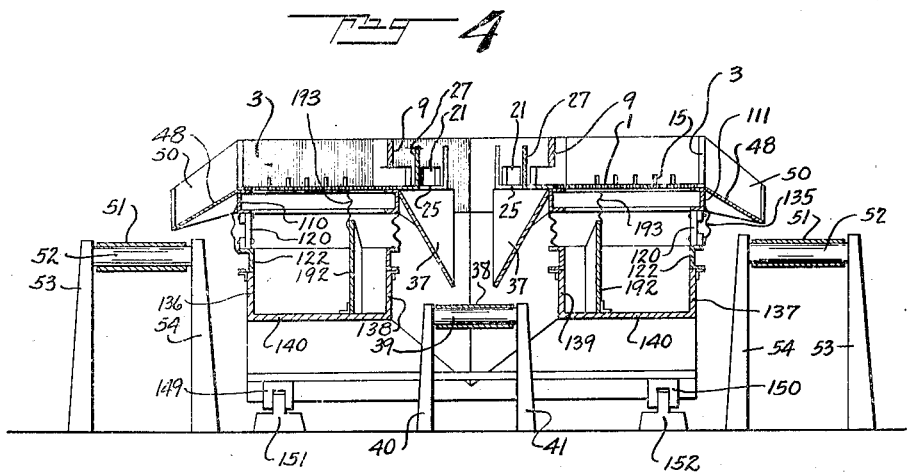
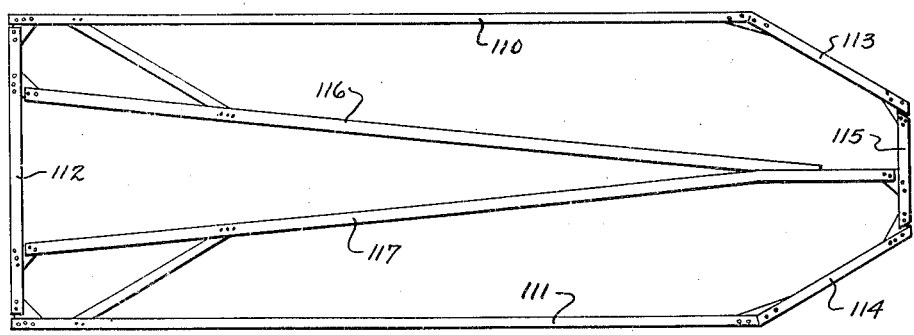
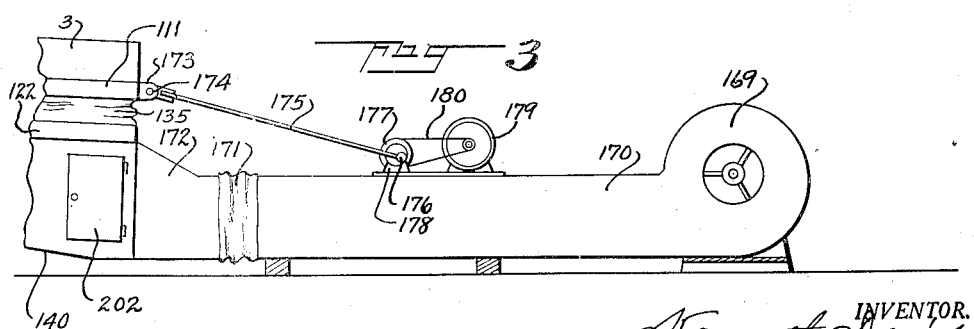

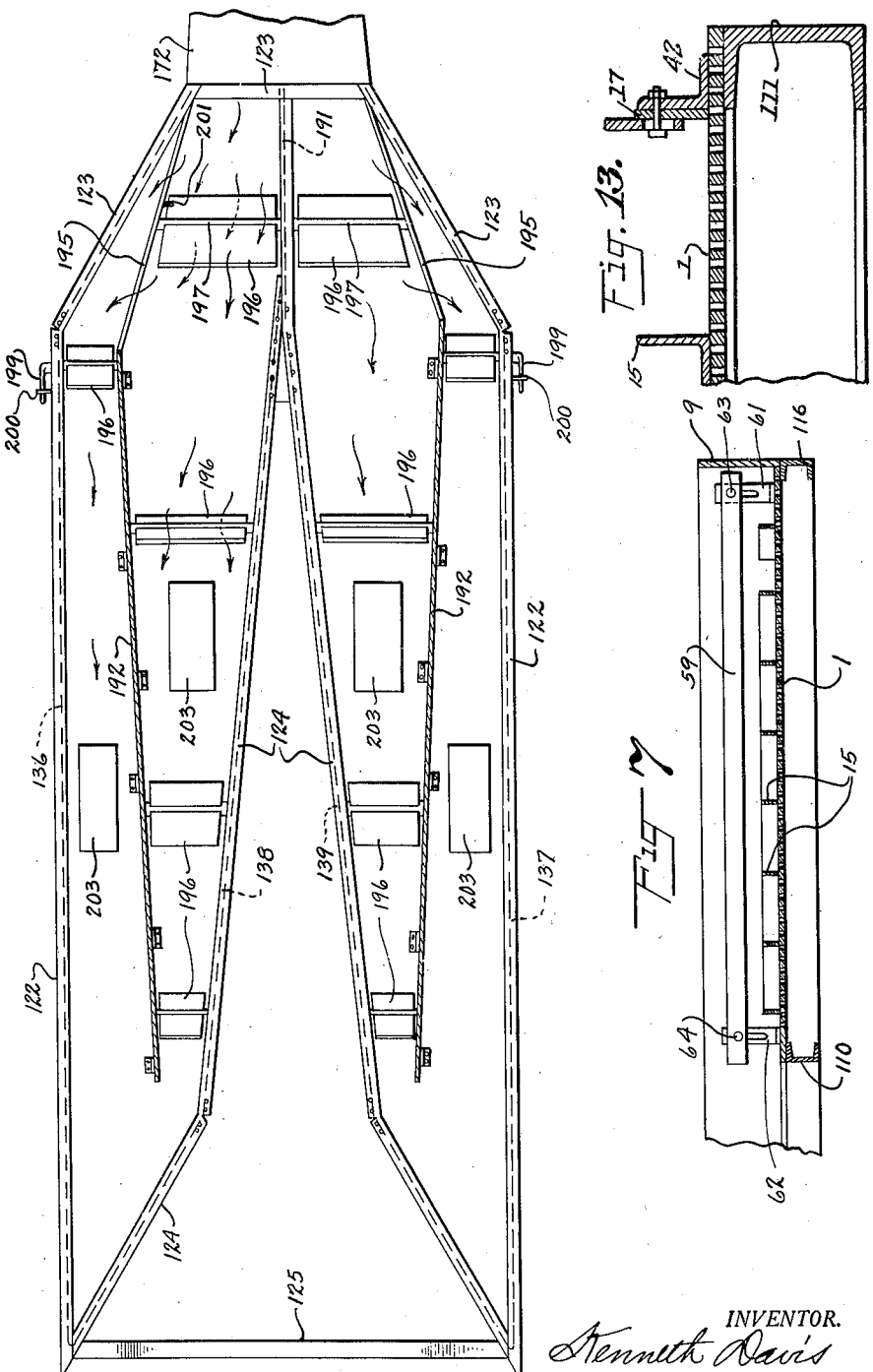

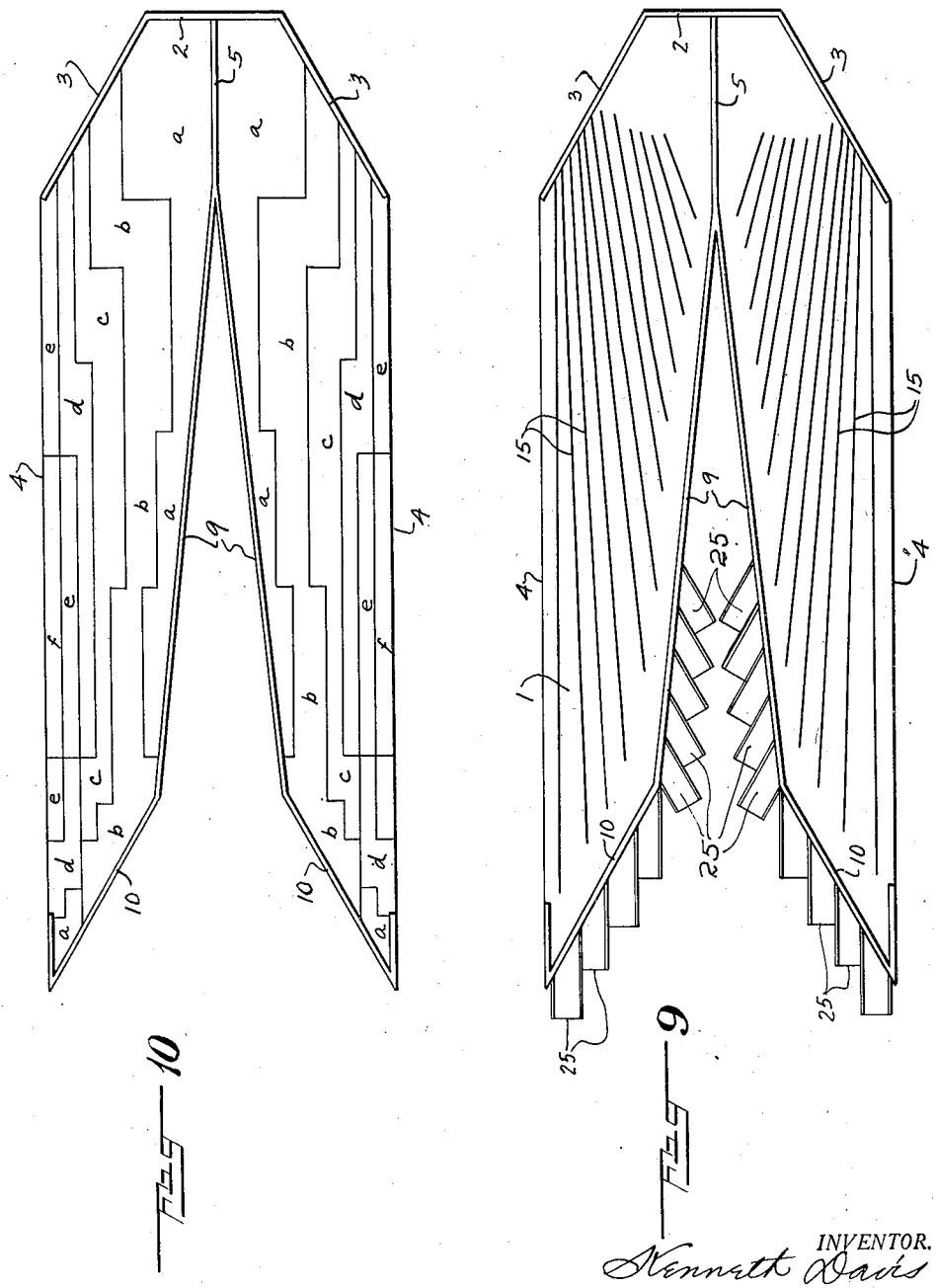

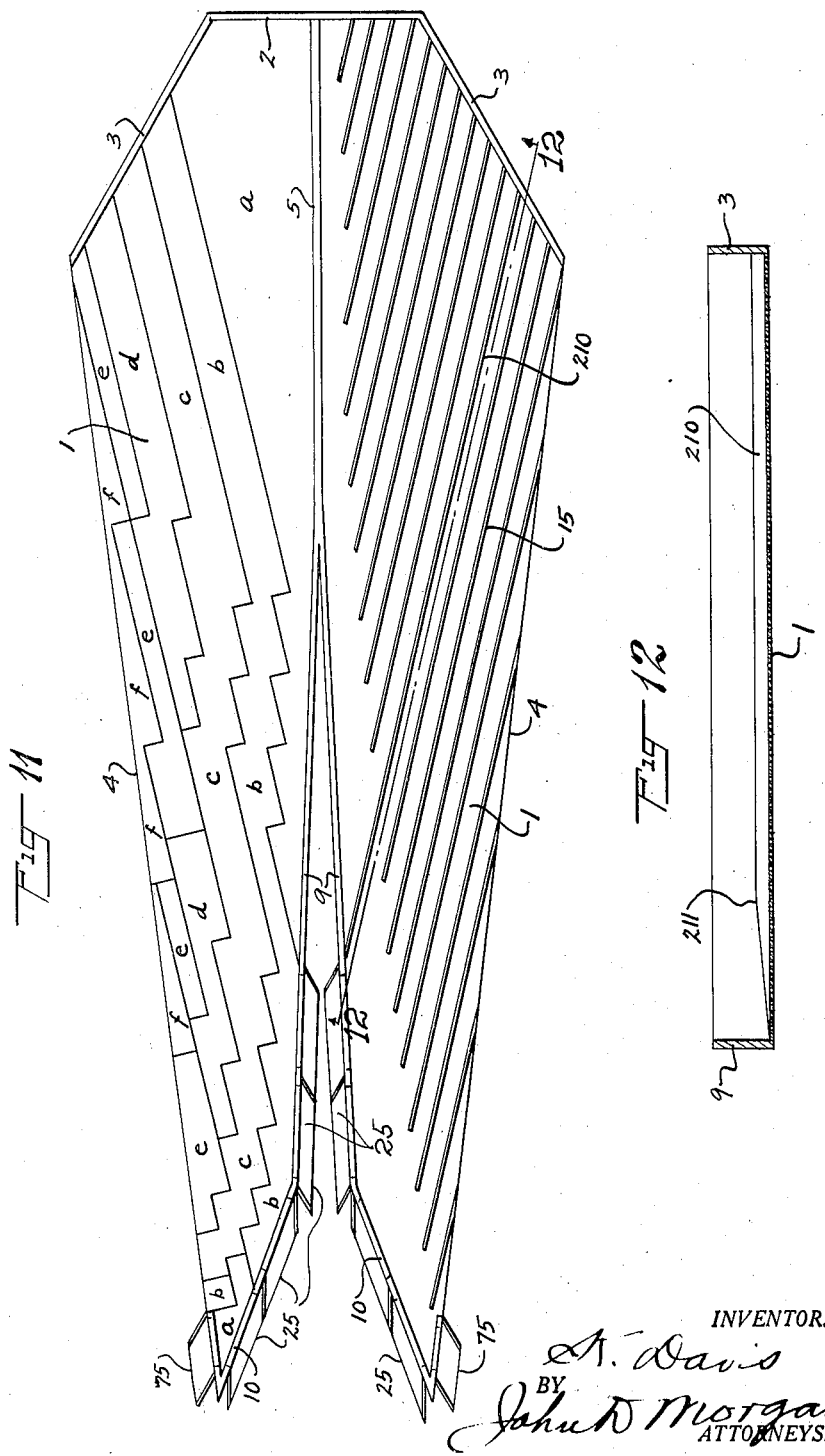

1,822,840

UNITED STATES PATENT OFFICE

KENNETH DAVIS, OF EBENSBURG, PENNSYLVANIA, ASSIGNOR, BY MESNE ASSIGNMENTS, TO PEALE-DAVIS COMPANY, OF WILMINGTON, DELAWARE, A CORPORATION OF DELAWARE

PROCESS AND MECHANISM FOR SEPARATING INTERMIXED DIVIDED MATERIALS

Application filed April 26, 1926. Serial No. 104,621.

The invention is directed to a novel and useful process and mechanism for seperating intermixed divided materials of different specific gravities; and more particularly to a process and mechanism for separating such materials which vary relatively greatly in the size of the intermixed fragments or particles, while on the other hand, varying relatively little in their specific gravities.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a top plan of a cleaning table embodying the invention;

Fig. 2 is a longitudinal, vertical section, taken substantially on the line 2—2 of Fig. 1, and of the parts thereabove;

Fig. 3 is a fragmentary elevation of the right-hand end of the mechanism shown in Figs. 1 and 2;

Fig. 4 is a transverse, vertical section, taken substantially on the line 4—4 of Fig. 1;

Fig. 5 is a detached plan of the main reciprocable, table-supporting frame;

Fig. 6 is an enlarged, fragmentary vertical section on line 6—6 of Fig. 1;

Fig. 7 is a detail fragmentary view of the guiding means for the stratified superior lighter material;

Fig. 8 is a full, horizontal section taken substantially on line 8—8 of Fig. 2;

Fig. 9 is a partially diagrammatic plan, corresponding to Fig. 1, but showing a somewhat different arrangement of the separating partitions;

Fig. 10 is a diagrammatic plan showing the preferred air-pressure zoning of the table;

Fig. 11 is a partially diagrammatic plan of a somewhat different form of table;

Fig. 12 is a section on line 12—12 of Fig. 11; and Fig. 13 is an enlarged, fragmentary, vertical section on line 13—13 of Fig. 1.

The invention comprises a process and mechanism for separating intermixed divided materials, and delivering the different separated materials apart from each other and free from intermixture. The invention is directed more particularly to providing an improved process and mechanism whereby intermixed materials are successfully separated, wherein the fragments or particles of the various materials vary very greatly in size, and wherein the various intermixed materials differ relatively but little in their specific gravities; the rapid and successful commercial separation thereof thus presenting a very difficult problem.

The expression "intermixed divided materials" is used for convenience herein in designating a mixture comprising two or more materials in granular, fragmentary, pulverulent, or other like state, whether natural or due to previous handling or operations.

An example of materials, in the mechanical conditions and having the physical properties already described, is a mixture of coal, "bone", and rock and other impurities, as it comes from the mine, and the present invention in actual practice has been chiefly directed to the automatic cleaning of the coal as it comes out of the mine, and without previous preparation or handling.

One of the principal and most valuable features of my process and mechanism is, the ability to practically completely separate coal, "bony" and rock without the preliminary "sizing" which has heretofore been necessary, and which constitutes a tremendous and practically prohibitive item of labor and expense. By my invention, I am enabled to practically complete the separation of the coal, "bony" and rock, as it comes from the mine, from the finest dust up to pieces three inches in dimensions, by a single operation and by running it over merely a single cleaning table, the coal going direct to the cars, and the rock to the rock heap, and the bony being handled in any way desired.

According to previous commercial practice, except by the cleaning tables disclosed in and covered by certain of my copending applications, it has been necessary to very closely size the coal by preliminary screening before attempting the automatic separation of the intermixed coal, bony and rock.

As an example of necessary previous commercial screening preparatory to separating:—All sizes above two inches were screened out; from two inches to 1 and ½ inches were screened as the next size; then from 1½ inches to 1 inch; from 1 inch to ½ inch; from ½ inch to ¼ inch; from ¼ inch to ⅛ inch, from ⅛ inch to $\frac{1}{16}$ inch; and from $\frac{1}{16}$ inch down were screened out on successive screens. Each of these sizes is then sent to a different separating table. Thus seven or eight different screens are required and seven or eight separating tables, one for each different size of the intermixed materials produced by screening, making about fourteen or more machines and operations in all.

By my invention, I dispense with all of the screening mechanisms of the prior art and with all but one of the separating tables. I use only a single large separating table, and over this single table I send the unprepared, intermixed materials, which prior to my invention were necessarily sent first over the several screening mechanisms, and then over the corresponding separating table, as described in the preceding paragraphs. I am able on this one table to practically completely separate the coal, rock, and bony and other impurities from three inches in dimension down to the finest dust.

My invention is applied to the separation of a continuous and forwardly flowing bed of the intermixed, divided materials, such as the unsized mixture of coal, bony and rock, the bed of materials undergoing separation being supported upon an air pervious table, through which a blast of air is driven from beneath upwardly through the bed of material, the table at the same time being moved or reciprocated to mechanically forward the separated heavier material, which has settled down upon the table, by friction and inertia toward a place of delivery, the gradation of the force of the air current and the table structure cooperating in the novel manner hereinafter set forth to accomplish the desired result.

The invention provides broadly for feeding on the material at a locus which is at or near the rear end of the separating table, and preferably entirely across this end, at such rate as to build up at the beginning, and thereafter to continuously maintain, upon the table a bed of materials of substantially uniform thickness, which moves gradually forwardly over the table. The materials undergo progressive separation, due to the combined air and mechanical actions, as they move forwardly, gradually approaching complete separation, which is effected before the separated materials are delivered from the table.

In connection with the loosening apart of the particles and the gradual stratification and separation of the lighter and heavier material proceeding progressively forwardly through the onwardly moving bed, the heavier and inferior material is progressed directly forwardly, from wherever it may come to rest upon the table, by friction and inertia, due to the movement of the table. There is no concentration of this heavier settled material into a single large central, or other stream, with the consequent disadvantages, but it is moved forwardly in many minute streams along the path of least resistance.

Extended areas, or many loci, for the discharge of the settled heavier material are provided, located at various points of greatest efficiency, both with respect to the length, breadth and form of the table.

The superior flotant stratum of lighter material is moved and guided transversely and is delivered from the side edges of the table, and by the shortest and most direct path, dependent upon whatever point at which clean stratification and separation of any particular part may be effected, devices being provided for regulably maintaining an efficient cooperation of these two features.

In connection with the foregoing, the air action is cooperatively proportioned and disposed to produce the completest and most satisfactory result in the difficult task of completely, or practically completely, separating the particles of intermixed material of such widely divergent dimensions and so closely related in relatively specific gravity. Accordingly, the areas or zones of greatest air activity is at or near the place of feeding on of the intermixed materials, and decreases substantially forwardly along the table, and also decreases transversely across the table in the direction of movement of the lighter stratified material, in conjunction with the forward disposition already described.

As a matter of structural and operating convenience, the preferred form of my table is duplex. That is, a right-handed unit and left-handed unit, as shown in Fig. 1, are constructed together, with a common frame, reciprocating means, and material-feeding means. So far as their essential structure and principle of operation are concerned, however, the units may be separate and independent.

Other features of the invention will be primarily set forth hereinafter, and it will be understood that the foregoing general description and the appended detailed description are illustrative and explanatory of the invention, but are not restrictive thereof.

The main features of the present preferred embodiment comprise an air-pervious deck preferably upwardly and forwardly inclined, with means for longitudinally rapidly reciprocating the table or deck into a short path, and means for regulating the intensity of the air currents in different parts of the table. One important feature of my table is that one of the side edges is inclined forwardly and inwardly, usually at a very easy angle, especially in the rear part thereof, this edge being provided with a vertical retaining wall, to prevent the discharge of the superior stratum of coal or other lighter material.

In the wall are provided a number of discharge orifices at the table level, to discharge the heavier material which has settled on the table; together with means for regulating the discharge therethrough of the rock or other heavier material, so as to prevent discharge of the other material, or remixture of the separated material. A plurality of spaced-apart separating partitions are arranged approximately longitudinally of the table, or somewhat inclined towards the forwardly and inwardly inclined side edge thereof, and terminating proximate thereto, but preferably leaving a channel or passage for the rock or heavier material along and to the place of discharge. Thus the heavier settled material is impelled by friction and inertia directly to discharge along a directly forward path from any point of settlement upon the table, and without concentration of the settled heavier material into a stream.

The superior lighter stratum of coal or other material is discharged over the opposite side edge of the table, which is preferably disposed substantially longitudinally of the table. There may be provided also deflector strips spaced above the table, and inclined forwardly and toward the discharge edge for the lighter material. By vertically variably positioning these strips, the immediate transverse discharge of the coal or other lighter material, in so far as it has been completely separated from the intermixture may be effected, at various points along the table. It will be understood that so far as concerns the general features of the invention some of the foregoing features may be omitted if desired, although they all cooperate together in the production of an efficient and desirable result.

Referring now in detail to the embodiment of the invention, illustrated by way of example, in the accompanying drawings, and as a desirable feature of structural and operating convenience and efficiency two tables as previously indicated, one right-handed and one left-handed, are shown in Fig. 1, mounted on a common reciprocable support and with common air current means and common feeding means. The detailed description of one table will suffice for both.

The table is provided with an air-pervious deck 1, which is preferably forwardly and upwardly inclined. At the rear end of the duplex table structure is a transversely-disposed retaining wall 2, extending upwardly from the back end of the table, to maintain the bed of materials thereon, the feed being preferably close to this end. Each table extends preferably forwardly and outwardly from the rear wall 2, and this reach forwardly and outwardly extending part of the table is likewise provided with a bed-retaining wall 3 extending upwardly from the edge of the table. The forward end of this wall 3 terminates at the side reach or edge 4 of the table used for the discharge of the superior stratified lighter material. This side edge 4 of the table is shown as extending directly forwardly for the remainder of the length of the table.

The opposite side edge of the table has a short upwardly projecting, longitudinally disposed retaining wall 5 which may be common to both of the duplex tables. From the front end of wall 5, this edge of the table is inclined inwardly and forwardly across the table, and is provided with a material bed-retaining wall 9, extending upwardly from the side edge of the table. The inward angle or inclination of this edge and its wall is relatively small for the greater portion of the length of the table, and is preferably again angled at a sharper inclination near the forward end and to the farther side of the table. This second angled portion is provided preferably with a bed-retaining wall 10 extending upwardly from said edge.

Means are provided on the surface of the table cooperating with the air currents passing upwardly through the table, and bed of intermixed materials thereon, for gradually effecting the separating or stratification of the intermixed materials, as the bed of materials travels slowly forwardly along the table. In the embodied form, there are provided a plurality of spaced-apart separating partitions 15, resting upon and extending upwardly from the surface of the table, and disposed substantially lengthwise of the table. The rear ends of most of the partitions 15 abut against the side wall 3, but the rear ends of those near the opposite side of the table are shown spaced from the rear wall 2. The forward ends of the separating partitions terminate proximate to the table side edge walls 9 and 10, so as to leave a generally forwardly-extending passageway between the ends of the separating partitions and the side walls to serve as a passage way for the heavier settled material.

In Fig. 1 the separating partitions 15 are shown parallelly arranged and longitudinally disposed with respect to the length of the table. In Fig. 9 the separating partitions are shown forwardly extending but diverging from each other slightly forwardly, at various degrees of inclination to the side edges 9 and 10 of the table, so as to direct the settled rock or other heavier material thereto in the most direct path. In both forms, however, the structure and arrangement is such that the rock or other heavy material which has been separated out and settled upon the table, is impelled forwardly, in the direction of the reciprocation of the table, from whatever point it may settle upon the table, and without concentration of the settled material into a stream. However, in the form shown in Fig. 9, it will be seen that a substantial proportion of the settled heavier material is directed by the separating partitions 15 to the unobstructed passageway which extends forwardly along the center of the duplex table from the rear or feed end thereof, and thence for a considerable distance along the divergent walls 9 to discharge.

Means are provided for discharging the rock or other settled material at practically the nearest point of its arrival at its discharging edge of the table, and in connection therewith devices for regulating the discharge of the rock, so as to prevent remixture of the separated material, or discharge of any of the lighter or still intermixed material. As embodied (Figs. 1 and 6), a plurality of openings 21 are provided in side walls 9 and 10 of the table. The openings 21 are preferably provided with means for varying the height of the opening, and as embodied, a plate 22 is mounted on the inner face of the wall, by means of bolt-and-slot connections 23, whereby the plate may be moved upwardly and downwardly across the upper end of the opening 21.

Exteriorly to the retaining walls 9 or 10 each of the openings 21 communicates with a chute or passageway 25, having a bottom 26 and side walls 27. Devices are provided in each passageway 25 for regulating the discharge of the rock or other heavy settled material, to keep the flow of rock level with the top of the opening 21, as determined by the bottom of the plate 22, or very slightly thereabove. Said devices as embodied, comprise a plate 28, upwardly and outwardly inclined, and having its bottom end pivoted at 29 to the bottom 26 of the chute. To variably and regulably position the inclined plate 28, a bar 31 is pivoted to the rear face thereof at 32, and extends downwardly through an opening 33 in the bottom 26 of the passageway. The bar 31 is provided with a series of teeth 34, which engage alternatively with the edge of the opening 33, and a spring 35 holds the bar resiliently against the edge of the opening 33.

The positionable plates 22 and 28 afford a very nice and exact regulation so that all the rock or other heavier settled material which is advanced to the opening may pass through with nicety, while on the other hand, the moving flow of rock will prevent any of the upper separated stratum from passing through the opening. The same is true with respect to any remaining intermixture of materials, which will be prevented from passing through the opening, and which will be further subjected to the separating operation farther along the table, the separating operation being completed for all the material before the forward end of the table is reached.

Means are provided for conveying away the discharged rock or other heavier material, and as shown, an inclined chute or plate 37 is suspended from the table structure, beneath the discharge ends of the passageways 25, and delivers the rock to an endless conveyor belt 38, running over rollers 39 journaled in supports 40 and 41. The belt 38 may be common to both tables of the duplex structure.

The discharge locus for the superior stratum of coal or other lighter material may occupy substantially the entire length of the opposite side edge of the table from the forward end of the bed-retaining wall 3, or only a portion of this edge. The outer separating partition 17 may be somewhat higher than those within, and may be variable in height if desirable. For this purpose, this partition 17 is constructed horizontally in two parts with bolt and slot connections 42 between the parts (Fig. 13). The top edge thereof may thus be positioned at a level to just permit the passage of all of the clean separated and stratified material, and the height of this edge may be also varied or inclined longitudinally of the table. For example, as indicated in Fig. 4 the forward portion of spillage partition 17 may have its edge at or about the level of the other separating partitions 15, while the rear portion may be elevated considerably, as indicated in Fig. 13. Exterior to the last separating partition is an edge or shelf 47, and supported from the table structure beneath the shelf, and inclined downwardly from said shelf is a chute 48 provided with end walls 49 and 50, the chute discharging onto an endless conveyor belt 51 running over rollers 52 journaled in supports 53 and 54.

In accordance with one feature of the invention optional means are provided for further facilitating the delivery of the superior flotant stratum of coal or other lighter material. As embodied, there are provided a plurality of deflecting strips 59, having their rear ends at or close to the bed-retaining walls 9 or 10, the deflecting strips being horizontally-disposed and inclined forwardly and toward the edge for the discharge of the lighter material, and extending substantially to that edge. The strips are spaced above the table and the separating partitions.

They are also preferably mounted to be variably positionable vertically, and if desired, they may be also arranged to vary their location along the table, and their direction of inclination. As shown, the deflecting strips 59 are mounted by means of bolt and slot connections 63 and 64 upon supports 61 and 62, which supports are fixed to and extend upwardly from the table 1, but may be adjustable or positionable longitudinally thereof by a bolt or bolt and slot connection 65. Thus the entirely clean superior stratum may be deflected immediately to the discharge edge of the table, while the still intermixed intermediate stratum is permitted to pass onwardly beneath the deflector strip with the movement of the bed, and is further subjected to the stratifying and separating action.

Means are provided by the invention, if desired, for separating an intermediate product, such as the "bony" found in most soft coals. In the present embodiment, such means are shown, comprising a reentrant terminal part 67 at the end of the wall 10, said part extending along the front end of the side edge of the table. Just to the rear of this part, is a chute 68, having side walls 69 and 70, the chute discharging onto an endless conveyor belt 71, running over rollers 72, journaled in supports 73 and 74. One of the deflecting partitions 60 may be used in conjunction therewith to establish a discharge line between the coal and the "bony", the coal going to the chute 48, and the bony to the chute 68. A discharge device 75, similar in structure to that shown in detail in Fig. 6, and already described, may be provided at the forward corner of the table, as shown in Fig. 1, and may be used for either rock or "bony", according to the kinds of materials, or the conditions of operation.

Means are provided for supplying the intermixed divided materials to the table, whether single or duplex, at such rate as to maintain the bed of materials upon the table of proper thickness. In the embodied form of such means, a hopper 85 is provided having side walls 86, and downwardly and inwardly inclined end walls 87 and 88. The bottom of the hopper is open and is provided with a transversely and horizontally disposed parti-cylindrical member 89. Within the member 89 is positioned the discharge-effecting and controlling device for feeding the intermixed materials to the table.

As embodied, a shaft 90 is journaled in the end walls of the hopper, and fixed thereon are a plurality of circular discs 91. Fixed to and extending between the discs 91 are a plurality of plates 92, tangentially positioned with respect to the shaft 90, and extending outwardly to the edges of the disc 91. A variable speed drive, of any convenient or known form (not shown) is provided for the shaft 90, whereby its speed of rotation may be varied to correspondingly regulate the feed-on of intermixed materials to the table. This feeding device in the duplex form of table exemplarily shown herein, is substantially across the rear end 2 of the table, but this may be varied in extent or position within relatively wide limits.

Means are likewise provided for collecting the dust arising from the bed of materials during the separating operation, and for this purpose a housing or casing 97, having side walls 98 and end walls 99 and 100, is suspended directly above the table, the feed hopper mechanism being conveniently constructed therewithin. A curtain 101 has its upper edge 102 fixed to the bottom edges of the dust collector housing, and extends downwardly about the table. The forward end of the table extends preferably a short distance farther than, and is outside, the dust collector housing and curtain. The dust collecting means may be of any known or suitable form, so far as concerns the present invention, the purpose being to settle and collect most of the dust and utilize it commercially.

Referring now to the supporting structure of the table, whereby it may be longitudinally reciprocated, the air-pervious bed or deck 1 is mounted upon a supporting frame (Figs. 1, 2, 4 and 5) comprising outer side reaches 110 and 111, a forward end reach 112, and angled rear reaches 113 and 114 and 115. Two longitudinally disposed central frame members 116 and 117 extend from the rear to the forward cross frames to support the inwardly and forwardly inclined side edges 9 of the table. It will be understood, of course, that the form of the frame is largely a matter of structural convenience and efficiency. The side reaches 110 and 111 of the table supporting frame have pivotally connected to their bottom faces at several points, 119 respectively, links 120. These links are pivoted at their bottom ends 121 to the top faces of corresponding side reaches 122 of a stationary, or non-reciprocating frame, forming part of the stationary portion of the air chamber.

The non-reciprocable frame comprises (Fig. 8) also angled rear-end members 123, and inner angled frame members 124, and a cross-brace 125. These are all connected together to constitute a top frame for the side walls of the non-reciprocating air-chamber structure. The links 120 are preferably inclined so that the short reciprocatory path of the table is upwardly and forwardly and downwardly and backwardly. A plurality of cushioning springs 128 are provided, in compression between supports 129, fixed to the reciprocable frame, and supports 130, fixed to the non-reciprocable frame.

A flexible air-impervious connection is provided between the reciprocable table and the non-reciprocable part of its air chamber, and for this purpose a flexible air-impervious material 135 has its upper edge fastened to the reciprocable frame members 110—115, and its lower edges fastened to the non-reciprocable frame members 122—124.

The non-reciprocating portion of the air chamber has side walls 136 and 137 and 138 and 139, the frame 122—124 being fastened to the upper edges of the side walls. The bottom 140 of the air chamber is preferably upwardly and forwardly inclined, to reduce the relative volume or cross sectional area of the chamber in the forwardly direction, to increase the efficiency thereof.

Means are preferably provided for changing the angle of inclination of the table longitudinally thereof, and as embodied, said means are applied to the non-reciprocating part of the air chamber. There is provided, accordingly, near the rear end and at either side, of the present duplex air chamber a plurality of pivotal mountings, comprising pivot lugs 149 and 150, projecting downwardly from the bottom of the air chamber, and pivotally connected to corresponding lugs 151 and 152, mounted upon the floor or other support.

Proximate the forward ends of the side edges of the bottom of the duplex air chamber, and extending downwardly therefrom are socket bearings 153. These rest, respectively, upon corresponding balls 154 formed on the upper ends of screw-threaded rods 155, these rods projecting downwardly into hollow cylinders 156, carried on supports 157. Nuts 158 are screw-threaded on the respective rods 155 and rest upon the top surfaces of the cylinders 156. By turning the nuts 158, the inclination of the table may be varied.

Air-current or air-pressure producing means are provided, of any suitable or convenient form, and as shown, a blowing fan 169 is provided, having an air passage 170, connected by a flexible air-impervious envelope 171 with the air passage 172. This passage is fixed to and leads into the non-reciprocating part of the air chamber.

The table-reciprocating means may be of any suitable or convenient form, and as embodied, there is attached centrally to the rear transverse reach 115 of the reciprocable table frame, a pivot lug 173, to which is pivotally connected at 174 the forward end of a link 175. Link 175 at its rear end 176 is pivotally connected to a crank-disc 177, fixed on a horizontally-disposed shaft, journaled in supports 178. This shaft is driven in any suitable manner, from any suitable source, such as a motor 179, and a speed-reducing and power-transmitting connection 180, which may be of any suitable or convenient form.

Means are provided for further controlling the air action in the different parts of the bed of materials, which is slowly moving forwardly along the table, to most efficiently adapt the air current action to the progressive stages of stratification and separation throughout the bed. The embodied devices comprise both air-current controlling and directing means, and also varying degrees of air-perviosity in different parts of the table, these having a definite relation to the direction of movement of the various intermixed and separating materials and the stages of progress of the separating operation.

Referring now to the air-current-controlling means (Figs. 2, 4 and 8), there is provided within the non-reciprocating part of the air-chamber a vertically-disposed wall 191, reaching from the bottom to the top of the intake portion 172 and centrally located transversely with respect thereto, and thus dividing the intake longitudinally into two parts corresponding to the two table units. This wall at its forward end connects to the side walls 138 and 139 of the two air chambers. Within either part of the duplex air chamber is a longitudinally disposed partition 192.

This partition 192 (Figs. 4 and 8) may be variably positioned, dependent upon the effect desired in and on the air currents passing through the different parts of the bed. That is, for instance, the transverse location and the longitudinal inclination of the partition may be varied or changed for the purpose indicated. A flexible air-impervious partition 193 is provided with its bottom edge fastened to the top edge of the partition 192 and its top edge fastened to the bottom of the table, to permit the reciprocatory movement of the table while maintaining the air-impervious partition.

Means are provided for directing the air currents from the fan to either side of the partition 192 in varying volume to aid or cooperate in regulating the air pressure in various parts of the bed. As embodied, the rear end of partition 192 is some distance in advance of the rear end of the air chamber. Connecting this rear end of the partition 192 and the side wall of the air chamber at or near the opening of the air conduit 172 into the air chamber, is a partition 195, extending upwardly from the floor of the air chamber, and connecting at either end with the side wall of the chamber and the rear end of partition 192 as just explained.

This partition 195, however, is not as high as the air chamber, and there is thus provided an air space over the top of the partition and beneath the table, which admits a relatively smaller volume of air to the outer side of the partition 192. The smaller volume of air driven through the relatively narrow opening over partition 195 and beneath the table will naturally result in a lesser air pressure and less air current intensity through the parts of the bed of materials exteriorly located with respect to the partition 192. It will be understood that the position and the height of the partition 195 may also be changed as desired. The forward end of the partition 192 also preferably terminates a short distance from the front end of the table.

Additional means may be provided, if desired, for regulating the air current intensity in different parts of the bed, and as embodied, one or more air-deflecting blades or vanes may be provided, located at desired points in the air chamber. As shown, there are a plurality of these located at different places longitudinally and on either side of partition 192. As embodied, each comprises a blade or vane 196, which is provided substantially centrally and transversely thereof with a supporting and positioning rod 197, which rod is journaled in the side walls or partition of the air chamber. The supporting and positioning rod may be at or near either end of the vane, if desired.

These deflecting blades or vanes are variably angularly positionable, by suitable means. Some of them are shown with their pivotal mounting rods 197 extending outwardly through the side-wall of the air chamber, and as terminating in a bent arm 199, cooperating with one or more positioning pins 200, to hold the vane or blade in position. Others of the blades are merely positioned by pins 201, which are inserted in holes in the side walls or partitions of the air chamber, and directly support the vanes or blades. These are accessible for positioning through suitable doors 202 in the side walls, or 203, in the bottom of the air chamber. The various doors may also be used to clean the coal dust or other dust or deposit from the air chamber.

It will be understood that the form and arrangement of the various air current directing and regulating devices may be widely changed and varied as may be found desirable in operating on different kinds of materials, or materials in different physical states.

The manner of operation of the mechanism will be understood from the foregoing description, but may be summarized as follows:

A bed of the materials, gradually and progressively undergoing separation, and moving forwardly along the table, will be assumed, the hopper 85 and the feeding device at its bottom feeding on the materials at a rate to maintain the bed of the desired thickness.

The air action, or the upward action of the air currents to the rear end of the bed of materials is sufficiently intense to loosen the relatively compact particles apart, and to move upwardly and float the particles of the lighter material, and probably some of the smaller particles of the heavier material. The particles of heavier material, or at least the larger ones, settle immediately and come to rest upon the table. The rapid reciprocatory movement of the table progresses the settled particles of materials forwardly along the table by the action of friction and inertia.

As the bed of materials moves forwardly, the wall 9 and the wall 10, being forwardly and inwardly inclined with respect to the table, tends to crowd the bed of materials to the other side of the table, and to give a resultant action obliquely to the direction of reciprocation of the table. The forwardly and rearwardly disposed spaced-apart separating partitions, however, impel the settled rock directly forwardly from all points of the table at which the particles may have settled, and the openings in the walls 9 and 10 for the discharge of the bed of rock, permit the rock to leave the table by these direct paths and avoid the concentration of the settled rock into a stream or streams.

The action of the openings 21, with their slides 22 movable to regulate the height of the openings, and the regulating plates 28 in the chute, regulably inclinable to control the rate of discharge of the rock, so as to discharge all the rock and prevent the discharge of coal, or of intermixed materials, has already been described.

The superior flotant stratum of coal or other lighter material is not constrained by the separating partitions, and due to the forces and structures already described it travels forwardly and laterally across the separating partitions. As it progresses forwardly, it becomes thicker and purer due to the progress in the separating action. As the air pressure varies, smaller and smaller particles of rock or other heavier material come to rest upon the table, or are flotant or impelled upwardly a distance less than the height of the separating partitions, and, therefore, are impelled forwardly in the direction of travel of the rock, and gradually come to rest upon the table, until finally the finest particles of the rock and the largest particles of the coal are completely separated.

The depth of the coal bed, especially toward the rear thereof, will normally be several times greater than the height of the separating partitions, and in practice the bed depth will usually be from 9 or 10 to 4 or 5 inches in depth. This will be obvious when it is considered that the normal bulk of heavy impurities in bituminous coal comprises less than 15% of the total mass, so that the greater bulk of the bed will float above the tops of the separating partitions, which are designed to deflect only the inferior stratum of rock.

To further effect and facilitate the easy and quick delivery of the completely separated coal, the deflecting partitions 59 are set so as to just clear the top of the intermediate stratum of still intermixed materials at the particular point lengthwise of the table. The forward travel of the bed and the coaction of the deflecting strip immediately crowd the layer of clean coal into the delivery chute 48, and as the process of separation progresses longitudinally of the table, the same thing will occur at the next deflecting strip 59. Thus there is nice regulation of separation between the entirely clean coal or lighter material, and the entirely separated rock or heavier material and the intermediate stratum of still intermixed material, at all points of the table, until final complete separation is obtained toward the forward end of the table. The separation of the intermediate product like bony will be understood from what has already been stated.

In Fig. 10 is shown an air-zoning system for the air-pervious decks of the table of Fig. 1. As embodied, the intensity of the lifting and loosening air action is caused to gradually decrease in the direction of coal flow, while the air action is also regulated longitudinally of the table to accommodate the settling of different sizes of rock at different parts of the table. The rear of the table is provided with a relatively strong zone $a$, wherein the large rock lumps are loosened and caused to sink to the table surface. The strong zone is continued forwardly along the inner edge of the table up to the point of discharge of the larger particles of impurities. The zoning decreases outwardly as indicated by the graduations $b$, $c$, $d$, $e$ and $f$, whereby the laterally flowing coal is treated to a gradual decrease in air action. Thus smaller and smaller rock particles settle to the table surface beneath the coal and are progressed forwardly in their respective zones.

In Figs. 11 and 12, the outer edge of both the right-handed and left-handed tables, jointly mounted on a single reciprocating frame, are shown with the outer edge of each table inclined inwardly from the rear end toward the front end of the table. A somewhat different air zoning system is shown in Fig. 11 which will be clear without further extended explanation, the letter $a$ indicating the zone or area of greatest air-current intensity and the letter $f$ the least, and the intervening letters correspondingly.

In these figures the bed-retaining side walls 9 and one separating partition 210 are shown in special relation, as an optional feature of the invention. This separating partition extends from the rearward part of the coal discharging edge of its table forwardly across the table entirely to the forwardly and inwardly inclined bed-retaining wall 9. In the part nearest the wall 9, the partition 210 has a part 211 sloping downwardly to the wall 9. This construction aids in impelling the settled rock or other heavier material toward the wall 9 and to impel the superior stratum of coal or other lighter material away therefrom and toward its discharge edge 4.

In the modification shown in Fig. 11, it will be seen that the junction between the divergent retaining walls 9 and the rear, central wall 5 is relatively distant from the rear or feed end of the table, as compared with the position of said junction point in the forms shown in Figs. 1 and 5. Furthermore, in the form of Fig. 11, it will be seen that the separating partitions 15 are disposed at a relatively sharp angle to the longitudinal axis of the table end to the straight and continuous side spillage edges 4. Thus a relatively long and longitudinally unobstructed passageway for settled heavier material extends along the center of the rear part of the table between the termini of the converging separating partitions. Similar unobstructed passageways communicate with said central passageway and extend along the divergent retaining walls 9, whereby the settled heavier material may travel in a central stream along the rear part of the table and then forwardly and outwardly along the divergent retaining walls to discharge.

From all the foregoing it will be understood that a mechanism and method has been provided constituting an exemplary embodiment of the invention, and realizing the objects and advantages herein set forth, together with other objects and advantages. It will be understood further that departures may be made from the exact mechanism as shown and described, within the scope of the accompanying claims, without departing from the principles of the invention and without sacrificing its chief advantages.

What I claim is:—

1. A mechanism for stratifying and separating intermixed divided materials varying greatly in size but varying relatively little in their specific gravities including in combination an air pervious table, the perviousness of which decreases toward the discharge portions thereof, means for passing air upwardly therethrough, means for vibrating the table, and means on the table top for directing the lowermost stratum in a plurality of individual streams to discharge, without intermixture of a plurality of the several streams and means for regulably discharging the streams of heavier materials progressively along the table.

2. A mechanism for stratifying and separating intermixed divided materials varying greatly in size but varying relatively little in their specific gravities including in combination an air pervious table, means for passing air upwardly therethrough, means for varying the air currents in different parts of the table, the table being inclined upwardly in the direction of flow of materials therealong, means for vibrating the table longitudinally, longitudinally extending partitions on the table, and means, at different heights above the partitions, for laterally deflecting the upper stratum to discharge at the side of the table.

3. A mechanism for stratifying and separating intermixed divided materials varying greatly in size but varying relatively little in their specific gravities including in combination an air pervious table, and inclined upwardly in the direction of flow of materials therealong, means for vibrating the table longitudinally, longitudinally extending partitions on the table for segregating the lowermost stratum of heavy materials into a plurality of individual streams, a widening discharge edge for the heavier material and separate discharge means for each of said individual streams.

4. A mechanism for purifying coal including in combination an air pervious table, means for maintaining thereon a bed of mine coal containing relatively large pieces and fine particles in intermixture, including devices for feeding said coal to the rear of the table, means for forcing air currents upwardly through the bed, means for stratifying the materials in horizontal superposed strata, means for impelling the heavier material straight forward along the table as soon as it settles to an inferior stratum, whereby the superior flotant stratum of lighter material is progressively purified, and means for mechanically diverting the superior flotant lighter material laterally substantially as soon as it rises to a superior stratum.

5. A mechanism for purifying coal including in combination an air pervious table, means for maintaining thereon a bed of mine coal containing relatively large pieces and fine particles in intermixture, including devices for feeding said coal to the rear of the table, means for forcing air currents upwardly through the bed, means for stratifying the materials in horizontal superposed strata, means for impelling the heavier material straight forward along the table as soon as it settles to an inferior stratum, whereby the superior flotant stratum of lighter material is progressively purified, and means for diverting the superior flotant lighter material laterally substantially as soon as it rises to a superior stratum and means for progressively discharging the settled heavier material as the lighter material is diverted therefrom.

6. A mechanism for purifying coal including in combination an air pervious table, means for maintaining thereon a bed of mine coal containing relatively large pieces and fine particles in intermixture, including devices for feeding said coal to the rear of the table, means for forcing air currents upwardly through the bed, means for stratifying the materials in horizontal superposed strata, means for impelling the heavier material straight forward along the table as soon as it settles to an inferior stratum, whereby the superior flotant stratum of lighter material is progressively purified, and means for diverting the superior flotant lighter material laterally substantially as soon as it rises to a superior stratum and a widening oblique discharge edge for the forwardly moving, settled, heavier material.

7. A mechanism for purifying coal including in combination an air pervious table, means for maintaining thereon a bed of mine coal containing relatively large pieces and fine particles in intermixture, including devices for feeding said coal to the rear of the table, means for forcing air currents upwardly through the bed, means for stratifying the materials in horizontal superposed strata, means for impelling the heavier material straight forward along the table as soon as it settles to an inferior stratum, whereby the superior flotant stratum of lighter material is progressively purified, means for decreasing the air lifting power in the direction of movement of the heavier materials, and means for diverting the superior flotant lighter material laterally substantially as soon as it rises to a superior stratum.

8. A mechanism for purifying coal including in combination an air pervious table, means for maintaining thereon a bed of mine coal containing relatively large pieces and fine particles in intermixture, including devices for feeding said coal to the rear of the table, means for forcing air currents upwardly through the bed, means for stratifying the materials in horizontal superposed strata, means for decreasing the air lifting power both forwardly and outwardly of the bed, means for impelling the heavier material straight forward along the table as soon as it settles to an inferior stratum, whereby the superior flotant stratum of lighter material is progressively purified, and means for diverting the superior flotant lighter material laterally substantially as soon as it rises to a superior stratum.

9. A mechanism for purifying coal including in combination an air pervious table, means for maintaining thereon a bed of mine coal containing relatively large pieces and fine particles in intermixture, including devices for feeding said coal to the rear of the table, means for forcing air currents upwardly through the bed, means for stratifying the materials in horizontal superposed strata, means for impelling the heavier material straight forward along the table as soon as it settles to an inferior stratum, whereby the superior flotant stratum of lighter material is progressively purified, means for decreasing the air lifting power in the direction of movement of the heavier materials, means for deflecting the superior flotant lighter material laterally substantially as soon as it rises to a superior stratum, and means for progressively discharging the settled heavier material from the bed as the amount of lighter material remaining unseparated therefrom decreases.

10. A mechanism for purifying coal including in combination an air pervious table, means for maintaining thereon a bed of mine coal containing relatively large pieces and fine particles in intermixture, including devices for feeding said coal to the rear of the table, means for forcing air currents upwardly through the bed, means for stratifying the materials in horizontal superposed strata, means for impelling the heavier material straight forward along the table as soon as it settles to an inferior stratum, whereby the superior flotant stratum of lighter material is progressively purified, and means for diverting the superior flotant material laterally substantially as soon as it rises to a superior stratum, means for progressively and regulably discharging the settled heavier material from the bed as the amount of lighter material remaining unseparated therefrom decreases.

11. The process of separating intermixed divided materials varying relatively greatly in size and varying relatively little in specific gravity which comprises maintaining on an air pervious table a bed of the materials undergoing separation by feeding the materials to the rear thereof, forcing air currents up through the bed to loosen the materials and effect flotant action on a lighter material while permitting a heavier material to come to rest on the table, impelling the heavier settled material forwardly to discharge by friction and inertia and without change of direction, progressively discharging the heavier material as the bed progresses along the table, and decreasing the thickness of the bed of materials by removing the superior flotant lighter material substantially as soon as it rises to the surface of the bed.

12. The process of separating intermixed divided materials varying relatively greatly in size and varying relatively little in specific gravity which comprises maintaining on an air-pervious table a bed of the materials undergoing separation by feeding the materials to the rear thereof, forcing air currents up through the bed to loosen the materials and effect flotant action on a lighter material while permitting a heavier material to come to rest on the table, impelling the heavier settled material to discharge by friction and inertia and without change of direction, progressively discharging the heavier material as the bed progresses along the table, and decreasing the thickness of the bed of materials by deflecting the superior flotant lighter material laterally by friction and inertia to discharge substantially as soon as it rises to the surface of the bed.

13. The process of separating intermixed divided materials varying relatively greatly in size and varying relatively little in specific gravity which comprises maintaining on an air-pervious table a bed of the materials undergoing separation by feeding the materials to the rear thereof, forcing air currents up through the bed to loosen the materials and effect flotant action on a lighter material while permitting a heavier material to come to rest on the table, impelling the heavier settled material to discharge by friction and inertia and without change of direction, progressively discharging the heavier material as the bed progresses along the table, and decreasing the thickness of the bed of materials by mechanically removing the superior flotant lighter material substantially as soon as it rises to the surface of the bed, and graduating the intensity of the air currents in the different parts of the bed to continue progressively the separating and stratifying action and to meet the changes in the bed.

14. A mechanism for purifying coal including in combination an air pervious table, means for maintaining thereon a bed of mine coal containing relatively large pieces and fine particles in intermixture, including devices for feeding said coal to the rear of the table, means for forcing air currents upwardly through the bed, means for stratifying the materials in horizontal superposed strata, means for impelling the heavier material straight forward along the table as soon as it settles to an inferior stratum, whereby the superior flotant stratum of lighter material is progressively purified, means for mechanically diverting the superior flotant lighter material laterally substantially as soon as it rises to a superior stratum, means for progressively discharging the settled heavier material from the bed as the amount of lighter material remaining unseparated therefrom decreases and means for discharging the residue of the bed at the forward extremity of the table as a separated material of intermediate specific gravity.

15. The process of separating intermixed divided materials varying relatively greatly in size and varying relatively little in specific gravity which comprises maintaining on an air pervious table a bed of the materials undergoing separation by feeding the materials to the rear thereof, forcing air current up through the bed to loosen the materials and effect flotant action on a lighter material while permitting a heavier material to come to rest on the table, impelling the heavier settled material to discharge by friction and inertia and without change of direction, progressively discharging the heavier material as the bed progresses along the table, and decreasing the thickness of the bed of materials by removing the superior flotant lighter material substantially as soon as it rises to the surface of the bed and discharging the residue of the bed at the forward extremity of the table as a separated material of intermediate specific gravity.

16. A mechanism for purifying coal including in combination an air pervious table, means for maintaining thereon a bed of mine coal containing relatively large pieces and fine particles in intermixture, including devices for feeding said coal to the rear of the table, means for longitudinally reciprocating the table, a plurality of substantially parallel separating partitions extending longitudinally of the table for directing settled heavier material straightforward in the direction of reciprocation to discharge, a front discharge edge disposed obliquely to the separating partitions for progressively discharging the settled heavier material, and means for progressively discharging a superior stratum of lighter material along a side edge of the table.

17. A mechanism for purifying coal including in combination an air-pervious table sloping upwardly toward the front end thereof, means for maintaining thereon a bed of mine coal containing relatively large pieces and fine particles in intermixture, means for longitudinally reciprocating the table, a plurality of substantially parallel separating partitions extending longitudinally of the table for directing settled heavier material straightforward in the direction of reciprocation to discharge, a front discharge edge disposed obliquely to the separating partitions for progressively discharging the settled heavier material, and means for progressively discharging a superior stratum of lighter material along a side edge of the table.

18. A mechanism for purifying coal including in combination an air-pervious table which is substantially horizontal transversely thereof, means for maintaining thereon a bed of mine coal containing relatively large pieces and fine particles in intermixture, means for longitudinally reciprocating the table, a plurality of substantially parallel separating partitions extending longitudinally of the table for directing settled heavier material straightforward in the direction of reciprocation to discharge a front discharge edge disposed obliquely to the separating partitions for progressively discharging the settled heavier material, and means for progressively discharging a superior stratum of lighter material along a side edge of the table.

19. A mechanism for purifying coal including in combination an air pervious table, means for maintaining thereon a bed of mine coal containing relatively large pieces and fine particles in intermixture, including devices for feeding said coal to the rear of the table, means for longitudinally reciprocating the table, a plurality of substantially parallel separating partitions extending longitudinally of the table for directing settled heavier material straightforward in the direction of reciprocation to discharge, a front discharge edge disposed obliquely to the separating partitions for progressively discharging the settled heavier material, and means for progressively discharging a superior stratum of lighter material along a side edge of the table comprising a plurality of deflecting members disposed along the table at different levels.

20. A mechanism for purifying coal including in combination a relatively long and forwardly narrowing, air-pervious table, means for longitudinally reciprocating the table, means for supplying and maintaining a forwardly progressing bed of coal on the table undergoing stratification and separation, means for passing lifting and loosening air currents through the bed, a spillage edge for lighter material extending substantially parallel to the line of reciprocation along one side of the table and means for crowding lighter material toward said spillage edge comprising a retaining wall extending forwardly and across the line of reciprocation and terminating at the spillage edge, a plurality of separating partitions extending forwardly and across the line of reciprocation at a reverse angle to the retaining wall but terminating short of said retaining wall, and an unobstructed passageway along the retaining wall for travel of settled heavier material delivered thereto by the separating partitions.

21. A mechanism for purifying coal including in combination a relatively long and narrow, air-pervious table, means for longitudinally reciprocating the table, means for supplying and maintaining a forwardly progressing bed of coal on the table undergoing stratification and separation, means for passing lifting and loosening air currents through the bed, a spillage edge for lighter material extending substantially parallel to the line of reciprocation along one side of the table, means for crowding lighter material laterally comprising a retaining wall extending forwardly and toward said spillage edge for a relatively great distance, a re-entrant extension on said retaining wall extending sharply across the front end of the table and thence reversely along the spillage side for a relatively short distance, a discharge orifice in the retaining wall substantially opposite said reversely angled portion, and means for varying the size of said orifice to regulate the discharge of heavier material therethrough.

22. A mechanism for purifying coal including in combination a relatively long and narrow, air-pervious table, means for longitudinally reciprocating the table, means for supplying and maintaining a forwardly progressing bed of coal on the table undergoing stratification and separation, means for passing lifting and loosening air currents through the bed, a retaining wall on the table extending forwardly and transversely to the line of reciprocation, a plurality of separating partitions on the table extending forwardly and transversely to the line of reciprocation at a reverse angle to that of the retaining wall, an unobstructed passageway for settled heavier material along said retaining wall beyond the ends of the separating partitions, and a spillage edge opposite the retaining wall and extending substantially parallel to the line of reciprocation.

23. A mechanism for purifying coal including in combination a relatively long and narrow, air-pervious table, means for longitudinally reciprocating the table, means for supplying and maintaining a forwardly progressing bed of coal on the table undergoing stratification and separation, means for passing lifting and loosening air currents through the bed, straight spillage edges for lighter material extending in the line of reciprocation along the side edges of the table, a barrier for crowding lighter material toward said spillage edges comprising retaining walls diverging forwardly and outwardly from the center line of the table to intersect the spillage edges, forwardly extending separating partitions on either side of the center line of the table, and a longitudinally unobstructed passageway for settled heavier material extending centrally along the table from the rear end thereof to the junction of the retaining walls.

24. A mechanism for purifying coal including in combination a relatively long and narrow, air-pervious table, means for longitudinally reciprocating the table, means for supplying and maintaining a forwardly progressing bed of coal on the table undergoing stratification and separation, means for passing lifting and loosening air currents through the bed, straight spillage edges for lighter material extending in the line of reciprocation along the side edges of the table, and a barrier for crowding lighter material toward said spillage edges, comprising retaining walls diverging forwardly and outwardly from the center line of the table to intersect the spillage edges, and a plurality of separating partitions converging forwardly toward said barrier but terminating short thereof to provide unobstructed passageways for heavier material therealong.

25. A mechanism for purifying coal including in combination a relatively long and narrow air-pervious table, means for longitudinally reciprocating the table, means for feeding coal and intermixed impurities to the rear end of the table and for maintaining a bed of said coal on the table, means for passing lifting and loosening air currents through the bed, straight spillage edges for the lighter material extending substantially parallel to the line of reciprocation along the side edges of the table, a barrier for crowding lighter material toward said spillage edges comprising retaining walls diverging forwardly and outwardly from substantially the center line of the table to terminate at the side spillage edges, a plurality of inwardly and forwardly converging separating partitions, and a clear passageway for heavier material extending forwardly along the center line of the table between the forward ends of the separating partitions from the feed end of the table to the juncture of the diverging walls and thence along either wall to the front of the table.

26. A coal cleaning table including in combination a relatively long and narrow air-pervious deck, means for feeding impure coal to the rear end of the deck, means for longitudinally reciprocating the deck, relatively long, straight and continuous coal-spillage edges extending forwardly along the side edges of the deck, a plurality of separating partitions at either side of the deck and converging forwardly and inwardly from the spillage edges, but terminating short of the center of the deck, a longitudinally unobstructed passageway for settled refuse extending forwardly from the rear end of the deck between the termini of the separating partitions, refuse passageways diverging forwardly from the forward end of said central passageway for conducting the settled refuse in two streams forwardly and outwardly past the termini of the separating partitions toward the coal spillage edges, a V-shaped retaining wall along the inner side of said divergent passageway and extending across the front end of the table to terminate at the side spillage edges, means for delivering coal along the greater extent of the side spillage edges, and means for delivering settled refuse at the front ends of the side edges adjacent the retaining walls.

27. A coal cleaning table including in combination a relatively long and narrow air-pervious deck, means for feeding impure coal to the rear end of the deck, means for longitudinally reciprocating the deck, relatively long, straight and continuous coal-spillage edges extending forwardly along the side edges of the deck, a plurality of separating partitions at either side of the deck and converging forwardly and inwardly from the spillage edges, but terminating short of the center of the deck, a longitudinally unobstructed passageway for settled refuse extending forwardly from the rear end of the deck between the termini of the separating partitions, refuse passageways diverging forwardly from the forward end of said central passageway for conducting the settled refuse in two streams forwardly and outwardly past the termini of the separating partitions toward the coal spillage edges, a V-shaped retaining wall along the inner side of said divergent passageway and extending across the front end of the table to terminate at the side spillage edges, at least a considerable extent of said V-shaped retaining wall being non-apertured, means for delivering coal along the greater extent of the side spillage edges, and means for delivering settled refuse at the front ends of the side edges adjacent the retaining walls.

28. A mechanism for separating intermixed divided material including in combination a relatively long and narrow air-pervious table, means for longitudinally reciprocating the table, means for passing lifting and loosening air currents through the table and a bed of materials supported thereon, substantially straight and continuous spillage edges extending forwardly along the longitudinal side edges of the table, separating partitions extending forwardly and inwardly from either spillage edge, a longitudinally unobstructed passageway for the settled heavier material between the ends of the separating partitions extending for a substantial distance forwardly along the table, the front portion of the table comprising two divergent branches narrowing toward the continuous spillage edges, and divergent retaining walls extending along the inner edges of said branches and terminating at said side spillage edges, means for delivering lighter material over the greater extent of said spillage edges, and means for delivering settled heavier material over said spillage edges adjacent the ends of said retaining walls.

29. A mechanism for separating intermixed divided material including in combination a relatively long and narrow air-pervious table, means for longitudinally reciprocating the table, means for passing lifting and loosening air currents through the table and a bed of materials supported thereon, substantially straight and continuous spillage edges extending forwardly along the longitudinal side edges of the table, separating partitions extending forwardly and inwardly from either spillage edge, a longitudinally unobstructed passageway for the settled heavier material between the ends of the separating partitions extending for a substantial distance forwardly along the table, the front portion of the table comprising two divergent branches narrowing toward the continuous spillage edges, and divergent retaining walls extending along the inner edges of said branches and terminating at said side spillage edges, the divergence of said walls increasing adjacent the spillage edges.

30. A mechanism for separating intermixed divided material including in combination a relatively long and narrow, longitudinally reciprocable, air-pervious table having substantially straight and continuous outer side edges, the forward portion of the table comprising two forwardly narrowing, divergent branches, divergent retaining walls extending along the inner sides of said divergent branches and terminating by intersecting said straight side edges, means for discharging flotant lighter material along the outer side edges of the table and means for directing settled heavier material toward and along the retaining walls to discharge, including separating partitions inclined forwardly and inwardly from either side of the table toward said divergent retaining walls.

31. A mechanism for separating intermixed divided material including in combination a relatively long and narrow, longitudinally reciprocable, air-pervious table having substantially straight and continuous outer side edges, extending substantially parallel to the line of longitudinal reciprocation, the forward portion of the table comprising two forwardly narrowing divergent branches, divergent retaining walls extending along the inner sides of said divergent branches and terminating by intersecting said straight side edges, means for discharging flotant lighter material along the outer side edges of the table and means for directing settled heavier material toward and along the retaining walls to discharge, including separating partitions inclined forwardly and inwardly from either side of the table toward said divergent retaining walls.

32. A mechanism for separating intermixed divided material including in combination a relatively long and narrow, longitudinally reciprocable, air-pervious table having substantially straight and continuous outer side edges, the table being inclined longitudinally upwardly from the rear toward the front end thereof, the forward portion of the table comprising two forwardly narrowing, divergent branches, divergent retaining walls extending along the inner sides of said branches and terminating by intersecting said straight side edges, means for discharging flotant lighter material along the outer side edges of the table and means for directing settled heavier material toward and along the retaining walls to discharge, including separating partitions inclined forwardly and inwardly from either side of the table toward said divergent retaining walls.

33. A mechanism for separating intermixed divided material including in combination a relatively long and narrow air-pervious table, having straight, continuous side edges extending substantially the length of the table, an air chamber beneath the table, means for maintaining on the table a bed of raw coal undergoing purification, separating partitions disposed forwardly and inwardly from the sides of the table but terminating short of the center thereof to provide an inner longitudinal refuse passage, a wall at the front of the table inclined forwardly and outwardly from an inner point to each side edge of the table, coal spillage means at the sides of said table and means for conducting settled refuse from said longitudinal passage to spillage means at the front ends of the side edges.

34. A mechanism for separating intermixed divided material including in combination a relatively long and narrow air-pervious table, means for longitudinally reciprocating the table, means for passing lifting and loosening air currents through the table and a bed of materials supported thereon, a substantially straight and continuous spillage edge extending a relatively great distance along the side of the table and substantially parallel to the line of reciprocation, separating partitions extending forwardly and across the line of reciprocation away from said straight spillage edge, a relatively high spillage partition along said edge, a bed retaining wall across the rear end of the table and extending a relatively short distance forwardly along the spillage side thereof, a retaining wall opposite the spillage edge and disposed transversely to the line of reciprocation and terminating at the forward end of the spillage edge, an unobstructed passageway for heavier material along said transverse retaining wall and beyond the termini of the separating partitions, means for delivering a separated stratum of lighter material over the greater extent of said spillage edge, and means for delivering settled heavier material over the front end of said spillage edge adjacent the termination of the retaining wall.

35. A mechanism for separating intermixed divided material including in combination a relatively long and narrow, longitudinally reciprocable, air-pervious table having substantially straight and continuous outer side edges, the forward portion of the table comprising two forwardly narrowing, divergent branches, divergent retaining walls extending along the inner sides of said divergent branches and terminating at the front ends of said straight side edges, means for maintaining a forwardly-progressing bed of materials upon the table undergoing separation, means for passing lifting and loosening air currents through the bed, means for delivering separated lighter material over the side edges of the table, means for separately delivering the settled heavier material, and means for controlling the distribution of the air currents to the bed of materials on the table including a plurality of independently positionable air-controlling vanes beneath the table.

36. A mechanism for separating intermixed divided material including in combination a relatively long and narrow air-pervious table having straight, continuous side spillage edges, an air chamber beneath the table, means for maintaining on the table a bed of raw coal undergoing purification, including devices for feeding raw coal to the rear end of the table, a bed-retaining wall across said rear end and side retaining walls extending forwardly and outwardly from the ends of the rear wall to the rear ends of said side edges, separating partitions disposed forwardly and inwardly from the sides of the table but terminating short of intersection to provide an inner longitudinal refuse passage, a wall at the front of the table inclined forwardly and outwardly from an inner point to each side edge of the table, coal spillage means at the sides of said table and means for directing settled refuse from said inner passage to discharge at the front ends of the side edges.

37. A mechanism for separating intermixed divided material including in combination a relatively long and narrow air-pervious table, means for feeding said materials to the rear end thereof, means for longitudinally reciprocating the table, means for passing lifting and loosening air currents through the table and a bed of materials supported thereon, substantially straight and continuous spillage edges extending forwardly along the longitudinal side edges of the table, separating partitions extending forwardly and inwardly from either spillage edge, a longitudinally unobstructed passageway for the settled heavier material between the ends of the separating partitions extending for a substantial distance forwardly along the table, a longitudinally-disposed dividing member in said passageway at the feed end of the table, the front portion of the table comprising two divergent branches narrowing toward the continuous spillage edges, and divergent retaining walls extending along the inner edges of said branches and terminating at said side spillage edges, means for delivering lighter material over the greater extent of said spillage edges, and means for delivering settled heavier material over said spillage edges adjacent the ends of said retaining walls.

In testimony whereof, I have signed my name to this specification.

KENNETH DAVIS.